(12) United States Patent
Chen et al.

(10) Patent No.: US 9,665,851 B2
(45) Date of Patent: May 30, 2017

(54) USING TEXT SUMMARIES OF IMAGES TO CONDUCT BANDWIDTH SENSITIVE STATUS UPDATES

(75) Inventors: Li Chen, Cary, NC (US); Thomas R. Haynes, Apex, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 868 days.

(21) Appl. No.: 13/425,572

(22) Filed: Mar. 21, 2012

(65) Prior Publication Data

US 2013/0144959 A1 Jun. 6, 2013

Related U.S. Application Data

(63) Continuation of application No. 13/311,258, filed on Dec. 5, 2011, now Pat. No. 8,903,911.

(51) Int. Cl.
| | |
|---|---|
| G06F 15/16 | (2006.01) |
| G06Q 10/10 | (2012.01) |
| G06Q 50/00 | (2012.01) |
| H04N 21/8549 | (2011.01) |
| G06Q 30/02 | (2012.01) |

(52) U.S. Cl.
CPC .......... *G06Q 10/107* (2013.01); *G06Q 50/01* (2013.01); *H04N 21/8549* (2013.01); *G06Q 30/0261* (2013.01)

(58) Field of Classification Search
None
See application file for complete search history.

(56) References Cited

U.S. PATENT DOCUMENTS

| | | | | |
|---|---|---|---|---|
| 2002/0051077 | A1* | 5/2002 | Liou | G11B 27/28 348/465 |
| 2004/0152493 | A1* | 8/2004 | Phillips | G08B 27/005 455/567 |
| 2006/0165379 | A1* | 7/2006 | Agnihotri | G06F 17/30787 386/231 |
| 2007/0229249 | A1* | 10/2007 | McNeal | A61B 5/0002 340/524 |
| 2009/0164408 | A1 | 6/2009 | Grigorik et al. | |
| 2010/0211868 | A1 | 8/2010 | Karmakar et al. | |
| 2010/0274847 | A1 | 10/2010 | Anderson et al. | |
| 2011/0022529 | A1 | 1/2011 | Barsoba et al. | |

(Continued)

OTHER PUBLICATIONS

Buongiorno, "Hellotxt", downloaded from http://itunes.apple.com/app/hellotxt/id366956386?mt=8#, on Dec. 5, 2011 (3 pages).

(Continued)

*Primary Examiner* — Viet Vu
*Assistant Examiner* — James Edwards
(74) *Attorney, Agent, or Firm* — Jordan IP Law, LLC

(57) ABSTRACT

Systems and methods of conducting status updates may incorporating a text summary of an image into a status update message, and determining whether to incorporate the image into the status update message based on a network condition associated with a network. In addition, the status update message can be sent via the network wherein, in one example, the status message is sent only to remote parties having a status that satisfies a relevance condition with respect to the content of the text summary.

18 Claims, 3 Drawing Sheets

(56) References Cited

U.S. PATENT DOCUMENTS

| | | |
|---|---|---|
| 2011/0047182 A1 | 2/2011 | Shepherd et al. |
| 2011/0141143 A1 | 6/2011 | Peterson et al. |
| 2011/0225048 A1 | 9/2011 | Nair |
| 2011/0255590 A1 | 10/2011 | Kim et al. |
| 2012/0041850 A1 | 2/2012 | Rabbah |
| 2012/0102121 A1* | 4/2012 | Wu .................. G06F 17/30705 709/206 |
| 2012/0123830 A1* | 5/2012 | Svendsen .......... G06Q 30/0252 705/14.5 |
| 2012/0123875 A1 | 5/2012 | Svendsen et al. |
| 2012/0210250 A1 | 8/2012 | Svendsen et al. |
| 2013/0003571 A1 | 1/2013 | Ochiai |
| 2013/0121481 A1 | 5/2013 | Mikan et al. |
| 2013/0182186 A1 | 7/2013 | Ikenaga |
| 2013/0346220 A1 | 12/2013 | Svendsen et al. |

OTHER PUBLICATIONS

Office Action for U.S. Appl. No. 13/311,258, mailed Jan. 24, 2014, 17 pages, United States Patent and Trademark Office.

* cited by examiner

USING TEXT SUMMARIES OF IMAGES TO CONDUCT BANDWIDTH SENSITIVE STATUS UPDATES

CROSS-REFERENCE TO RELATED APPLICATIONS

The present application is a continuation of U.S. patent application Ser. No. 13/311,258 filed on Dec. 5, 2011.

BACKGROUND

Embodiments of the present invention generally relate to social networks. More particularly, embodiments relate to the use of image text summaries to automatically generate status updates for social networks.

Staying connected with friends and family in modern times may involve the use of social networking sites, instant messaging software, and other online tools. Such tools may provide the user with the ability to issue status updates so that others in the user's social network can be kept abreast of the user's activities. Issuing status updates, however, may require users to pause their activities in order to log into the tool, enter the status updates via a keyboard, download photos to a computer, upload the photos to the online tool, etc. The time and networking bandwidth required to conduct such a process may be prohibitive, could cause the user to forego use of the online tool, and may ultimately lead to lost connections with friends and family.

BRIEF SUMMARY

Embodiments may provide for a computer implemented method in which a text summary of an image is incorporated into a status update message. The method may also involve determining whether to incorporate the image into the status update message based on a network condition associated with a network, and sending the status update message via a network interface associated with the network.

Embodiments can also include a computer program product having a computer readable storage medium and computer usable code stored on the computer readable storage medium. If executed by a processor, the computer usable code may cause a computer to incorporate a text summary of an image into a status update message, and determine whether to incorporate the image into the status update message based on a network condition associated with a network. In addition, the computer usable code can cause a computer to send the status update message via the network.

Additionally, embodiments may include a device having an interface to a network, an image capture module to generate an image, a processor, a computer readable storage medium, and computer usable code stored on the computer readable storage medium. If executed by the processor, the computer usable code may cause the device to incorporate a text summary of the image into a status update message, determine whether to incorporate the image into the status update message based on a network condition associated with the network, and send the status update message via the interface to the network. In addition, the computer usable code may cause the device to track whether the text summary has been sent with the image in the status update message or the text summary has been sent without the image in the status update message.

Other embodiments may include a computer implemented method in which a focus point of an image is determined, and the focus point is used to create a text summary of the image. The method can also provide for incorporating the text summary into a status update message, and incorporating the image into the status update message if a network condition associated with a network is satisfied. If the network condition is not satisfied, the image may be excluded from the status update message, wherein the network condition can include at least one of a bandwidth condition and a speed condition. In addition, the method may involve sending the status update message via a network interface associated with the network, and tracking whether the text summary has been sent with the image in the status update message or the text summary has been sent without the image in the status update message.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
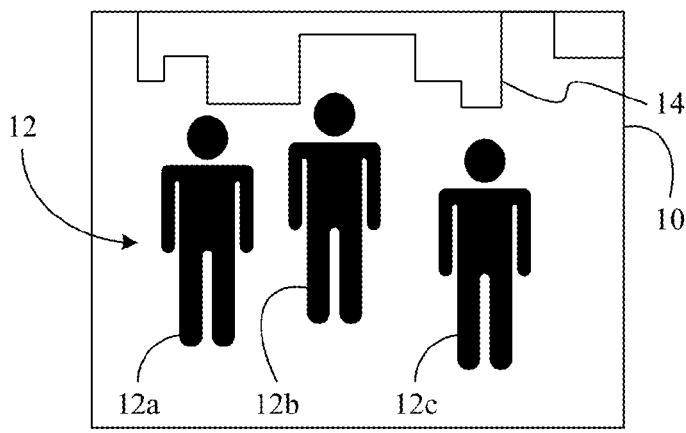
FIG. 1 is a block diagram of an example of an image according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an image 10 is shown in which a plurality of subjects 12 (12a-12c) are captured in a setting 14. The image 10 could be captured by a device such as a camera, camcorder, camera enabled computing platform (e.g., smart phone, tablet, laptop), etc., wherein the subjects 12 might be individuals engaging in a wide variety of activities such as having coffee at a café, having lunch at work, playing at a community playground, and so forth. As will be discussed in greater detail, the image 10 may be used to automatically update the status of an individual associated with the image 10 in an online site such as a social networking or instant messaging (IM) site. The individual whose status is being updated may be one of the subjects 12 or someone who is associated with (e.g., the parent of) one of the subjects 12. In one example, the focus point of the image 10 may be used, along with one or more computer vision techniques, to automatically create a text summary of the image 10, wherein the text summary can be incorporated into a status update message for the individual in question. Moreover, the status update solution can take into consideration the state of the communication network being used to conduct the status update. Thus, the status update message may selectively incorporate the image 10 based on whether the network has sufficient bandwidth and/or speed to transmit the image 10. In this regard, the file size of the image 10 may be considerably larger than the text summary.

Figure 2:
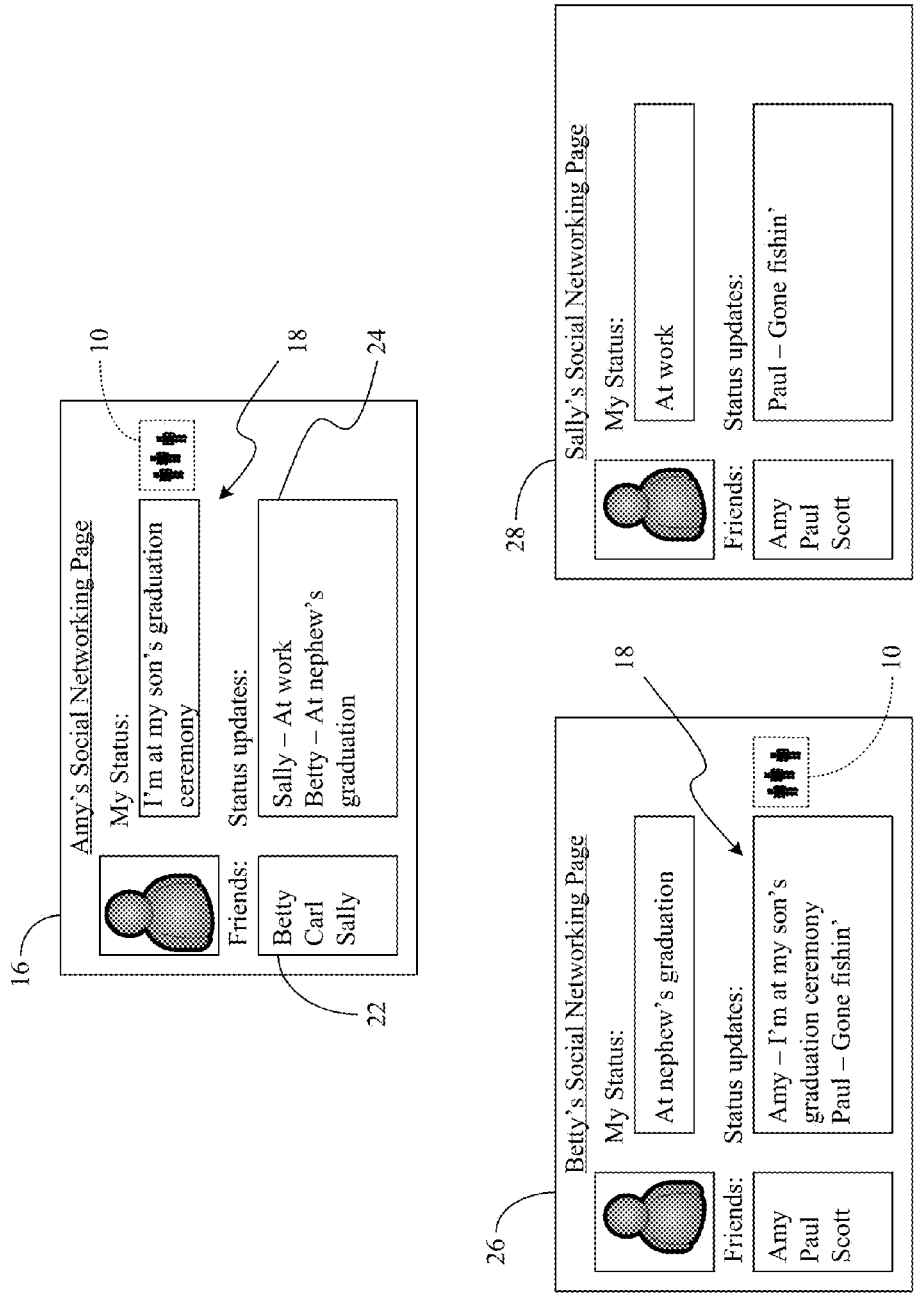
FIG. 2 is a block diagram of an example of a social networking implementation according to an embodiment.

FIG. 2 shows a set of social networking pages that can benefit from the techniques described herein. In particular, a first page 16 ("Amy's Social Networking Page") includes a text summary 18 of the image 10 taken by "Amy" using an image capture device. In the illustrated example, the image 10 has been analyzed using one or more computer vision techniques such as facial recognition, object recognition, etc., and an automated determination has been made that the image 10 is of a graduation ceremony. In addition, the focus point of the image capture device may be used to further refine the content of the text summary 18. For example, it might be determined that the subject 12b (FIG. 1) is the focus point of the image 10, wherein the subject 12b is identified (e.g., through facial recognition) as being Amy's son. Accordingly, the automatically created text summary 18 states that "I'm at my son's graduation ceremony".

Of particular note is that the text summary 18 is also automatically published (e.g., pushed) to the social networking site that hosts the page 16. Moreover, the image 10 may also be pushed to the social networking site based on the state of the network that the image capture device uses to send the status update to the social networking site. For example, if only a cellular (e.g., analog, roaming, "3G") connection is available, the image 10 could be excluded from the status update (e.g., particularly, if the individual lacks a sufficient data plan to support the file transfer). Indeed, the text summary 18 may be transmitted via an SMS (short messaging service) message without the need for involving any other communications interface or network. The exclusion may be temporary (e.g., until a high speed/bandwidth connection becomes available), or permanent (e.g., if the individual changes to another activity/location). If, on the other hand, a high data speed and/or bandwidth (e.g., broadband, "Wi-Fi", "4G") connection is available, the image 10 might be incorporated into the status update along with the text summary 18.

The illustrated example also demonstrates that the status of one or more remote parties may be used to determine the distribution of the status update. In particular, the status update might be sent to a particular remote party only if the status of the remote party satisfies a relevance condition with respect to the text summary 18. Thus, the first page 16 may include a friends listing 22 that identifies the friends (e.g., remote parties) of the user in question, and a friend update section 24 that contains the status updates of the friends of the user in question. In the illustrated example, two of Amy's friends have posted status updates—"Sally" has indicated that she is "At work", and "Betty" has indicated that she is "At nephew's graduation". These status updates may have been created manually or automatically by a system similar to the one used by Amy. Since Betty's status is relevant to the content of Amy's text summary 18 (e.g., they both involve a graduation), Amy's text summary 18 may be sent to a second page 26 associated with Betty. Sally's status, however, is not relevant to the content of Amy's text summary 18. Accordingly, a third page 28 associated with Sally does not receive Amy's status update, in the example shown. The illustrated approach may therefore further reduce the load placed on the network by intelligently determining how to distribute status updates based on the content of image text summaries.

Figure 3:
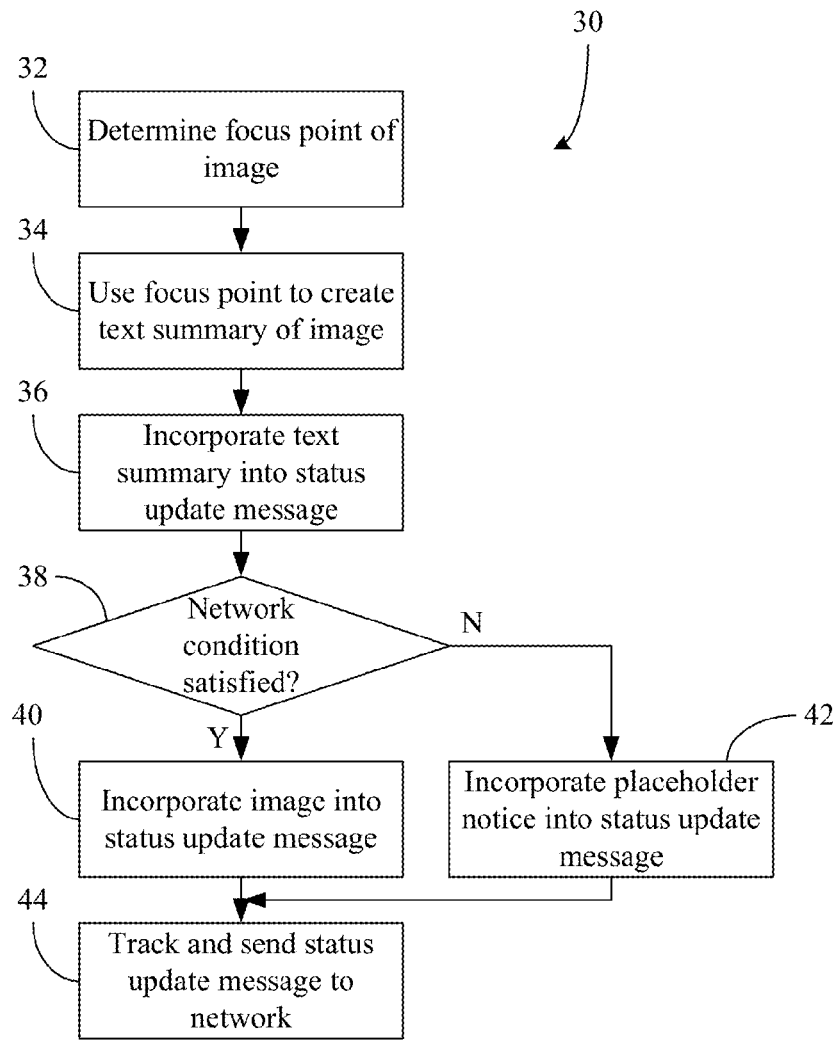
FIG. 3 is a flowchart of an example of a method of conducting status updates according to an embodiment.

Turning now to FIG. 3, a method 30 of conducting status updates is shown. The method 30 could be implemented in a device having image capture functionality and the ability to upload captured images to other platforms. The illustrated processing block 32 determines a focus point of an image, wherein the focus point may be used at block 34 to create a text summary of an image. As already noted, the creation of the text summary could involve the use of one or more computer vision techniques. Block 36 can incorporate the text summary into one or more status update messages, and block 38 may determine whether a network condition is satisfied. The determination at block 38 could involve evaluating the types of connections available, the communication bandwidth of the available connections, the communication speed of the available connections, and so forth. Thus, the network condition might specify that a certain type of connection (e.g., Wi-Fi) is available.

If it is determined that the network condition is satisfied, illustrated block 40 incorporates the image into the status update messages along with the text summary. If the network condition is not satisfied, a placeholder notice may be incorporated into the status update messages at block 42, wherein the placeholder notice can indicate that the image is missing but will be uploaded later. Block 42 may also provide for flagging the image for future transmission (e.g., when the network condition is satisfied), as well as filtering the recipient list of the status update messages based on the statuses of one or more remote parties and the content of the text summary, as already discussed. Illustrated block 44 sends the status update messages to the network. Block 44 may also provide for tracking whether the text summary has been sent with the image in the status update message or the text summary has been sent without the image in the status update message so that later on, when the network condition is satisfied, previously unsent images can be sent out accordingly.

Figure 4:
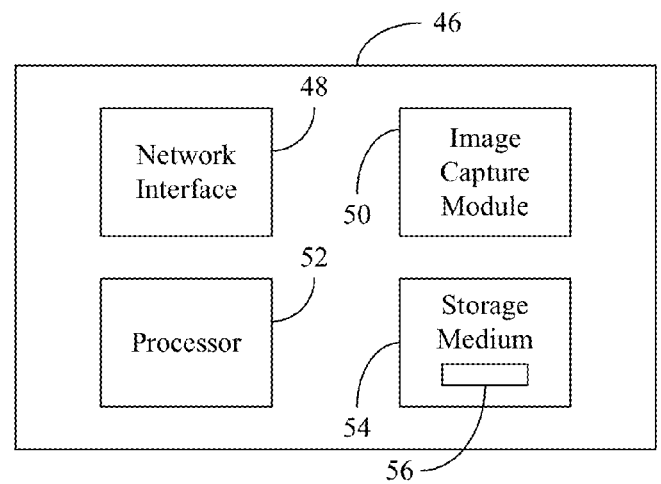
FIG. 4 is a block diagram of an example of a device according to an embodiment.

FIG. 4 shows a device 46 that may be used to conduct status updates according to the techniques described herein. The device 46 could include a camera, camcorder, smart phone, tablet, laptop, etc. In the illustrated example, the device 46 includes a network interface 48 to communicate over a wireless data connection (e.g., IEEE 802.11, 1999 Edition, LAN/MAN Wireless LANS (Wi-Fi), IEEE 802.16-2004, LAN/MAN Broadband Wireless LANS (WiMAX), etc.), a cellular telephone connection (e.g., 3G, 4G, W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 3.0 Specification)), etc., depending upon the circumstances.

The illustrated device 46 also includes an image capture module 50 configured to generate an image (e.g., still or video), a processor 52, and a computer readable storage medium 54 having computer usable code 56. If executed by the processor 52, the computer usable code 56 may cause the device 56 to incorporate a text summary of the image into a status update message, determine whether to incorporate the image into the status update message based on a network condition associated with a network, and send the status update message via the interface 48 to the network. In one example, the computer usable code 56 may also cause the device 46 to determine the status of one or more remote parties associated with a social networking site, and send the status update message to the remote parties only if the statuses of the remote parties satisfy a relevance condition with respect to the content of the text summary.

Figure 5:
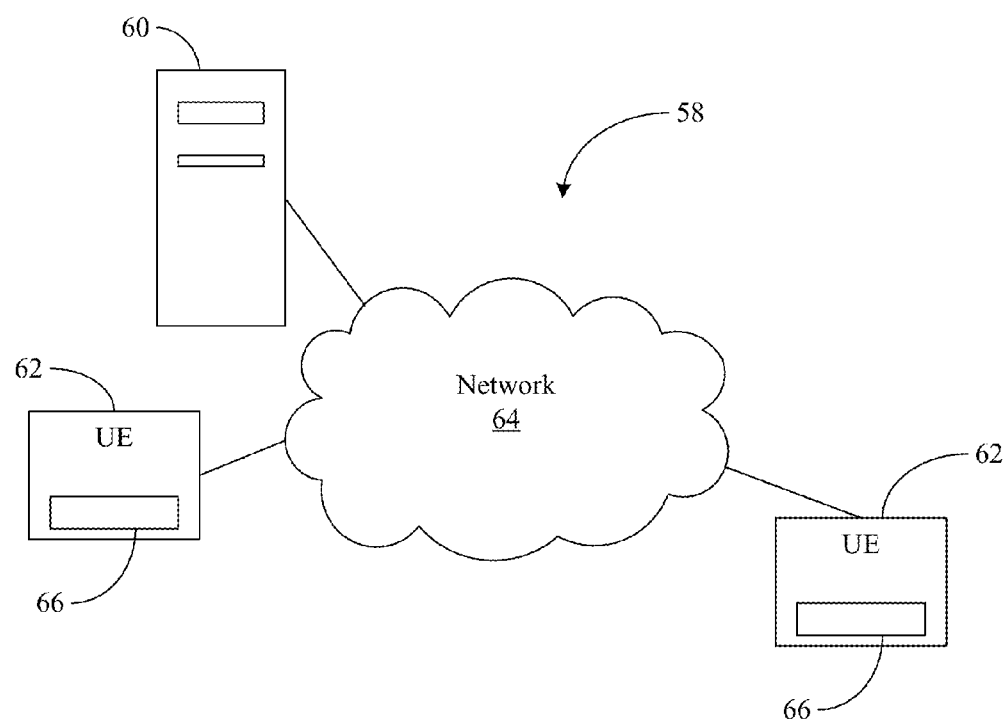
FIG. 5 is a block diagram of an example of a computing architecture according to an embodiment.

FIG. 5 shows a networking architecture 58 in which a server 60 is coupled to user equipment (UE) devices 62 via a network 64, wherein the network 64 can itself include any suitable combination of servers, access points, routers, base stations, mobile switching centers, public switching telephone network (PSTN) components, etc., to facilitate communication between the UE devices 62 and the server 60. The server 60 may include a social networking site and/or IM site having the ability to publish and/or advertise the status of its users. In the illustrated example, the UE devices 62 include logic 66 to incorporate text summaries of images into status update messages, determine whether to incorporate the images into the status update messages based on one or more conditions/states of the network 64, and send the status update messages to the server 60 via the network 64, as already discussed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
determining a non-textual focus point of an image;
incorporating a text summary into a status update message, wherein the text summary is automatically generated based on an evaluation of the non-textual focus point of the image to provide content that includes a textual explanation of an activity of an individual associated with the image in the status update message;
incorporating the image into the status update message if a network condition associated with a network is satisfied, wherein the network condition includes at least one of a bandwidth condition and a speed condition;
excluding the image from the status update message if the network condition is not satisfied;
sending the status update message via a network interface associated with the network; and
tracking whether the text summary has been sent with the image in the status update message or the text summary has been sent without the image in the status update message.

2. The method of claim 1, wherein the status update message is sent to a social networking site via the network.

3. The method of claim 2, further including determining a status of a remote party associated with the social networking site based on a status update of the remote party, wherein the status update message is to be sent to the remote party only if the status of the remote party based on the status update of the remote party satisfies a relevance condition with respect to the text summary.

4. The method of claim 1, wherein the status update message is sent to an instant messaging site via the network.

5. A computer implemented method comprising:
incorporating a text summary of an image into a status update message, wherein the text summary is automatically generated based on an evaluation of a non-textual focus point of the image to provide content that includes a textual explanation of an activity of an individual associated with the image in the status update message;
determining whether to incorporate the image into the status update message based on a network condition associated with a network;
sending the status update message via a network interface associated with the network; and
tracking whether the text summary has been sent with the image in the status update message or the text summary has been sent without the image in the status update message.

6. The method of claim 5, wherein the network condition includes at least one of a bandwidth condition and a speed condition.

7. The method of claim 5, further including:
incorporating the image into the status update message if the network condition is satisfied; and
excluding the image from the status update message if the network condition is not satisfied.

8. The method of claim 5, wherein the status update message is sent to a social networking site via the network.

9. The method of claim 8, further including determining a status of a remote party associated with the social networking site based on the status update of the remote party, wherein the status update message is to be sent to the remote party only if the status of the remote party based on the status update of the remote party satisfies a relevance condition with respect to the text summary.

10. The method of claim 5, wherein the status update message is sent to an instant messaging site via the network.

11. The method of claim 5, further including determining the non-textual focus point of the image.

12. The method of claim 5, further including using a focus point of the image to automatically refine the content of the text summary.

13. The method of claim 5, wherein the individual associated with image includes an individual in the image, and wherein the status update corresponds to the individual in the image.

14. The method of claim 5, wherein the individual associated with image includes an individual associated with an individual in the image, and wherein the status update corresponds to the individual associated with the individual in the image.

15. The method of claim 5, wherein the individual associated with image includes an individual associated with an image capture module that captures the image, and wherein the status update corresponds to the individual associated with the image capture module that captures the image.

16. The method of claim 5, further including:
automatically determining that the image is of an event based on an analysis of the image; and
specifying the event in the textual explanation of the image in the status update message.

17. The method of claim 5, further including publishing only the image captured along with the text summary in the status update message.

18. The method of claim 5, further including:
incorporating a placeholder notice into the status update message to indicate the image is missing and is to be uploaded in the future from a determination that the network condition associated with the network is not satisfied; and
flagging the image for future transmission from the determination that the network condition associated with the network is not satisfied.

* * * * *